United States Patent [19]

Stevens et al.

[11] Patent Number: 4,572,718
[45] Date of Patent: Feb. 25, 1986

[54] ANTI-ROTATION LOCKING ASSEMBLY

[75] Inventors: Stanley J. Stevens, Atco, N.J.;
Jeffrey G. Hoffman, Hatfield, Pa.

[73] Assignee: General Signal Corporation, Stamford, Conn.

[21] Appl. No.: 594,586

[22] Filed: Mar. 29, 1984

[51] Int. Cl.⁴ .............................................. F16B 39/00
[52] U.S. Cl. ................................... 411/107; 411/119; 411/180; 411/226; 29/505
[58] Field of Search ............... 411/103, 119, 107, 177, 411/108, 178, 180, 181, 217, 221, 222, 226, 223, 232, 234, 239; 29/505

[56] References Cited

U.S. PATENT DOCUMENTS

| | | | |
|---|---|---|---|
| 1,613,493 | 1/1927 | Turner et al. | 411/226 |
| 2,537,527 | 1/1951 | Heckert | 411/107 |
| 4,067,371 | 1/1978 | Stencel | 411/107 |
| 4,425,699 | 1/1984 | Nordin | 29/505 |

FOREIGN PATENT DOCUMENTS 2113808 8/1979 Fed. Rep. of Germany ...... 411/180

Primary Examiner—Kenneth J. Dorner
Assistant Examiner—Neill Wilson
Attorney, Agent, or Firm—Harold Huberfeld; William G. Miller, Jr.

[57] ABSTRACT

An anti-rotation locking assembly is provided for preventing rotation of a surface such as in a housing member with respect to a threaded shaft as on a body to which the housing member is threadably mounted. There are provided two opposing flats or relief surfaces on the end of threaded shaft extending beyond the housing surface. A recess is provided in the surface around the hole for accepting a locking c-ring. The recess has a non-circular profile in the plane of the surface to prevent rotation of the ring in the hole. A ring having an outer profile matching that of the recess is provided. The ring has outer dimensions and a shape to its sides which will cause its periphery to engage and cam over the sides of the recess. A threaded nut is provided for threading on the shaft over the ring to press the sides of the ring into the recess so as to cause the ring to grip the flats and engage the sides of the recess upon tightening.

Preferably the profile of the recess and the ring is hexagonal with the ring having straight sides and the recess tapered sides. The ring is also preferably of harder material than the sides of the recess so that the sides of the recess will be plastically deformed after elastic deformation of the ring has caused it to grip the flats of the threaded shaft.

5 Claims, 5 Drawing Figures

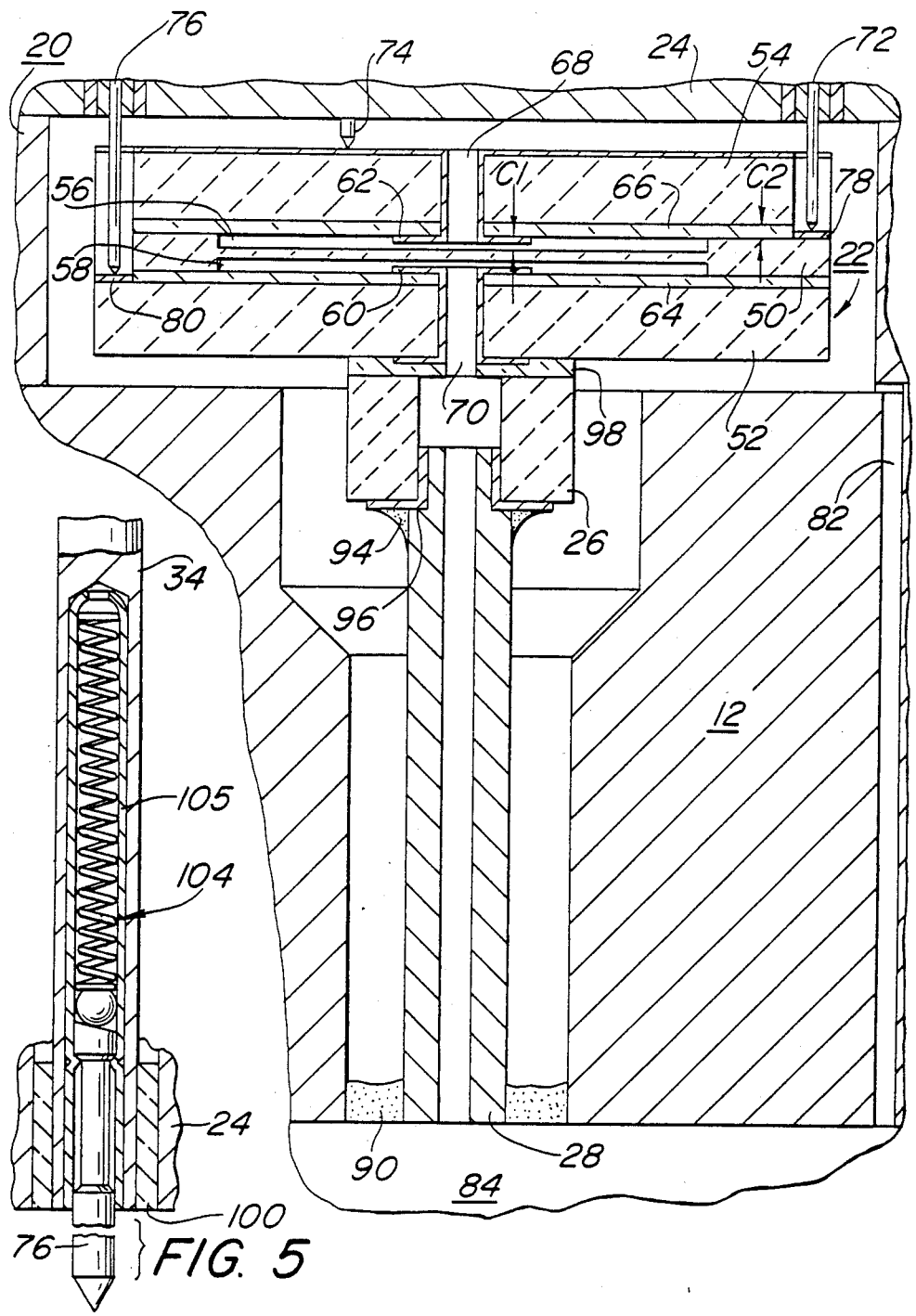

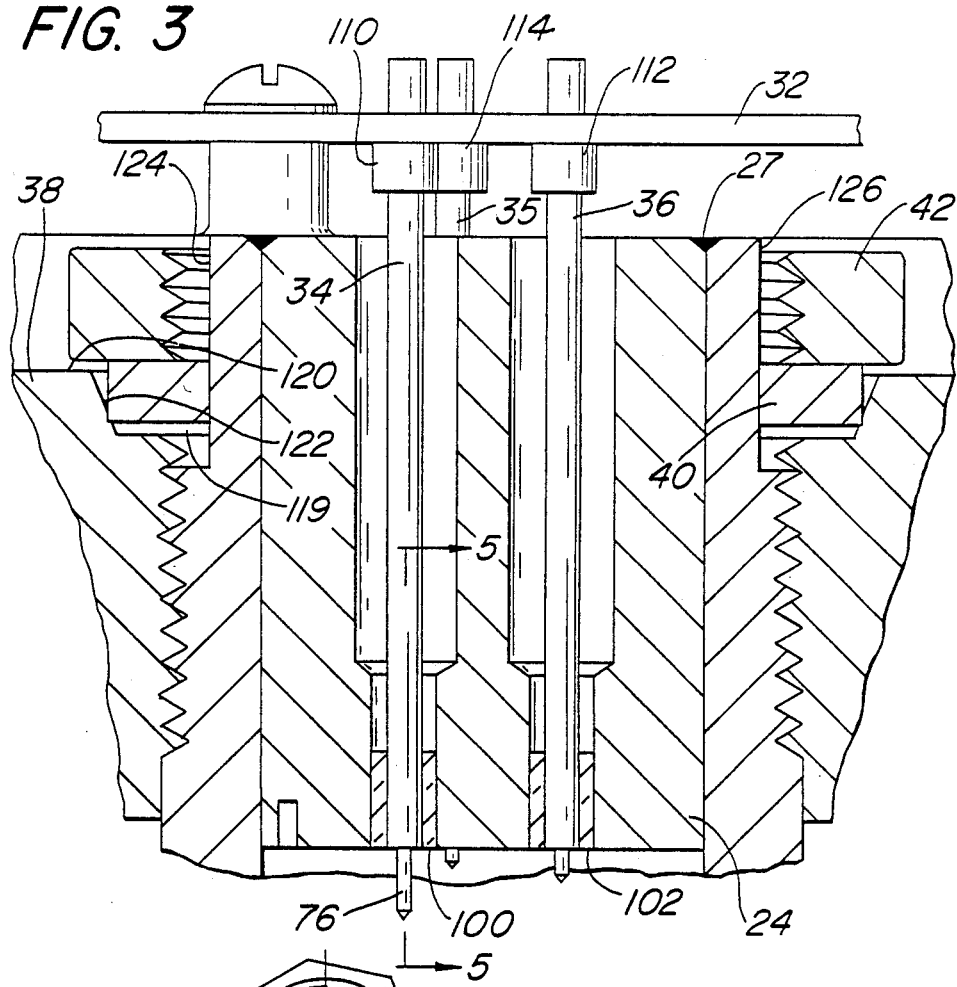

ANTI-ROTATION LOCKING ASSEMBLY

BACKGROUND OF THE INVENTION

This invention relates to an anti-rotation locking assembly of the type that is useful in preventing rotation of a surface with respect to a threaded shaft or body inserted in a hole through the surface. This invention has particular use in the mounting of housings on pressure transducers. In certain of this type of transducer the electrical contact between a circuit card mounted in the housing and elements of the transducer is completed by means of spring loaded plunger type contacts incorporated in an electrical feedthrough. These contacts may mate with the circuit card in such a way that rotation of the housing and hence the circuit card with respect to the feedthrough, can not be tolerated. In such assemblies, it is important to provide a means for preventing rotation of the housing with respect to the rest of the assembly.

It is an object of this invention to provide an improved antirotation locking assembly which is inexpensive to manufacture but is nevertheless strong enough to provide a strong anti-rotation locking effect in the mounting of housings on assemblies such as pressure transducers.

SUMMARY OF THE INVENTION

An anti-rotation locking assembly is provided for preventing rotation of a surface such as in a housing member with respect to a threaded shaft as on a body to which the housing member is threadably mounted. There are provided two opposing flats or relief surfaces on the end of threaded shaft extending beyond the housing surface. A recess is provided in the surface around the hole for accepting a locking c-ring. The recess has a non-circular profile in the plane of the surface to prevent rotation of the ring in the hole. A ring having an outer profile matching that of the recess is provided. The ring has outer dimensions and a shape to its sides which will cause its periphery to engage and cam over the sides of the recess. A threaded nut is provided for threading on the shaft over the ring to press the sides of the ring into the recess so as to cause the ring to grip the flats and engage the sides of the recess upon tightening.

Preferably the profile of the recess and the ring is hexagonal with the ring having straight sides and the recess tapered sides. The ring is also preferably of harder material than the sides of the recess so that the sides of the recess will be plastically deformed after elastic deformation of the ring has caused it to grip the flats of the threaded shaft.

BRIEF DESCRIPTION OF THE DRAWINGS

In the drawings, where like reference characters identify like parts:

FIG. 2 is a cross section showing the transducer construction and the mass for mounting the transducer.

FIG. 3 is a cross section showing the bulkhead of the transducer assembly and its electrical feedthrough.

FIG. 4 is an exploded view showing details of the anti-rotation locknut arrangement used to prevent rotation of the electronics housing with respect to the pressure receiving body. This view shows the pressure receiving body with the bulkhead removed.

FIG. 5 is a cross section showing details of the spring loaded contacts of the feedthrough in the bulkhead.

DESCRIPTION OF THE PREFERRED EMBODIMENT

Figure 1:
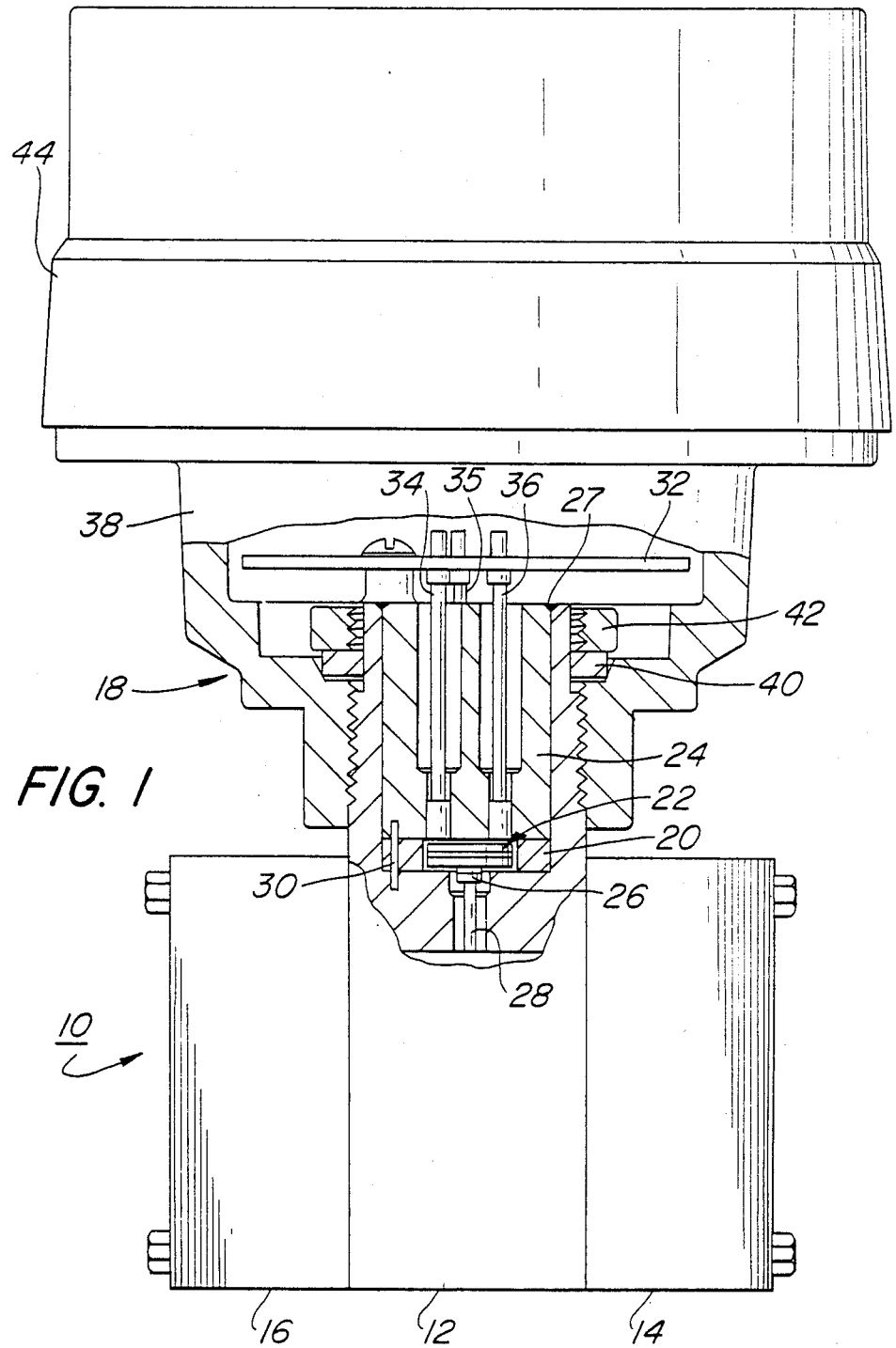
FIG. 1 is a front elevation of a pressure transducer assembly with that part which houses the pressure transducer itself broken away to show the transducer, its mounting, and the electrical feedthrough in cross section.

FIG. 1 is a view, partially in section, of a differential pressure measuring transducer assembly which includes a pressure receiving section 10 having a pressure receiving body 12 which in turn has mounted to it a flange 14 on the high pressure side and a flange 16 on the low pressure side. The pressure receiving body is constructed to accomodate at its pressure receiving end the usual barrier diaphragms, covered by the flanges 14 and 16, as well as high pressure and low pressure receiving chambers and any overprotection means required. Since these elements of the pressure receiving section are well known in the art, and since they form no part of the present invention, they are not shown in FIG. 1 or the other drawings.

The transducer section 18 is shown in cross section in FIG. 1. In this section the pressure measuring end of a stainless steel pressure receiving body 12 is shown having a large bore for accepting a washer shaped spacer 20 which in turn accepts a pressure transducer in its interior. The spacer and transducer are surmounted by a Kovar cylindrical bulkhead forming a feedthrough body 24 which is welded in place to the pressure receiving body 12 at the weld point 27. This weld must be strong enough to withstand the maximum static pressure to which the transducer is to be subjected. The pressure measuring section also includes the transducer 22 and mounting means for securing the transducer to the pressure measuring body 12. This monting means includes a silicon stub 26 and an alloy mounting tube 28 which has approximately 54% iron, 28% nickel, and 18% cobalt, such as the alloy known as Kovar.

Spacer 20 and feedthrough body 24 are assembled in the proper orientation on the pressure receiving body 12 by means of the locator pin 30.

The electrical connection from a circuit board 32 to the transducer 22 is provided by the electrically conducting rods 34, 35, and 36, which fit in holes in the feedthrough body 24 and are sealed to the feedthrough body by a glass to metal seal at the end of the feedthrough body closest to the pressure transducer. Holes are bored in the ends of the rods nearest the transducer so that those ends will accept spring loaded plunger type contacts which provide the electrical contact to the transducer when the feedthrough is assembled in place.

The measuring section 18 is covered by an electrical housing 38 which is threadably mounted onto a shaft like end of the pressure receiving body 12 and held in place with a locking c-ring 40 and a nut 42. The housing 38 has a cover 44 threaded on it to protect the circuit components and other elements in the housing.

FIG. 2 shows in cross section the details of the pressure transducer and its mounting as well as the manner in which they both fit into the pressure measuring sections 18.

The transducer 22 has a silicon diaphragm 50 which has a circular recess etched into its opposite faces to thereby form the deflecting section of the diaphragm. The diaphragm, being of highly doped silicon, is a conductor and also forms one electrode of the transducer.

Parallel silicon support plates 52 and 54 are anodically bonded to the opposite sides of the diaphragm along its periphery to thereby form pressure receiving cavities 56 and 58. The anodic bonding requires the use of a nonconductor such as borosilicate glass between the parts to be bonded. The glass will also serve to electrically isolate the diaphragm from the fixed electrodes of the transducer. These fixed electrodes are shown as deposited thin films of metal 60 and 62, which are laid down on the borosilicate glass layers 64 and 66, respectively. It will be noted that the borosilicate glass layers extend over the entire surface of the support plates 52 and 54 opposite the deflecting portion of the diaphragm so that upon deposition of the electrodes 60 and 62 the spacing between those fixed electrodes and the diaphragm is determined solely by the depth of the etched recesses in the diaphragm. This construction creates on each side of the transducer a stray capacitance $C_2$ (through the borosilicate glass) which is in parallel with the transducer capacitance $C_1$. The effect of the stray capacitance, of course, is to reduce the transducer output signal. Therefore, it is desireable to minimize $C_2$ by maximizing the thickness of the borosilicate glass while at the same time minimizing the effects of Young's modulud by minimizing the thickness of the glass. Obviously these two desires are conflicting and it is necessary to determine the thickness of the glass by establishing the desired specifications for the transducer as to span shift.

Each of the support plates has a pressure communicating passage through it. These are shown in FIG. 2 as 68 and 70. These passages are coated with a thick film of metal as is the entire top of plate 54 and a part of the bottom of plate 52 as well as contact pad areas 78 and 80. These metal deposits provide the conductive pads for connecting to the fixed plates 60 and 62 as well as diaphragm 50.

Electrical contact between circuit board 32 by way of feedthrough 24 is provided by the spring contacts 72, 74, and 76, respectively. Contacts 72 and 76 make contact through the conducting pads 78 and 80 which are deposited on the diaphragm and the lower plate, respectively, in the sections of the transducer shown broken away for that purpose.

The transducer 22 is spaced from the body 12 and spacer 20 which is utilized to provide support for the feedthrough body 24 spacing it from the transducer. The spacer 20 has V-grooves in its bottom surface to provide a passage from the high pressure passage 82 for silicone oil which fills the cavities of the transducer assembly. By virtue of these spaces the outside surfaces of the transducer and the high pressure aperture 68 are subjected to the pressures on the high pressure side of the line connected to the high pressure side of the pressure receiving section 10 of FIG. 1. The low pressure side of the pressure receiving section 10 is connected to the aperture 70 by way of a passage through the Kovar alloy tube 28 and the silicon stub 26 which connects with low pressure region 84 of the pressure measuring body 12. It should be noted that since the lower support plate 52 is spaced from the body 12 the only firm connection between the transducer and the body 12 is provided by the weld 90. That weld firmly affixes the tube 28 to the body 12. The top end of the tube 28 has reduced diameter which fits inside the hole in silicon stub 26 and is affixed at the joint 94 as by either soldering, brazing or by the use of epoxy, for example. To accomodate soldering or brazing the silicon stub shown is provided with a metal film on its lower surface and its interior. The stub 26 is anodically bonded to the lower support plate 52 by way of an interposed thin borosilicate glass layer 98 between the stub and the plate.

For the purpose of minimizing the effects of Young's modulus in the mounting structure it is desirable to make the diameter of the tube where it fits into the stub a minimum value and to make the thickness of the glass layer 98 as thin as possible. It is also desirable to make tube 28 as long as possible in order to increase the mechanical isolation of the tranducer with respect to the pressure receiving body.

Exemplary dimensions of the elements of the transducer and its mounting are as follows:
  diaphragm 50—0.5 in. square and 0.0078 in. thick with recesses 0.0006 in. deep
  plates 52,54—0.5 in. square and 0.072 in. thick
  glass layers 64,66—thickness of 0.008 in.
  glass layer 98—0.006 in. thick
  stub 26—0.1 in. high×0.2 in. square
  tube 28—0.125 in. dia.×0.3 in. long FIG. 3 shows in cross section the electrical feedthrough arrangement for making an electrical connection between the electrical circuits on the circuit card 32 and the elements of the transducer 22. Since three connections are required for the present transducer, three holes are drilled in the feedthrough body 24. The rods 34 and 36 are electrical conducting elements shown inserted in two of those holes. These rods are sealed to the circumference of the respective holes by glass pressure seals 100 and 102. The ends of the rods toward the transducer are drilled to provide a hole in the end of each rod of diameter smaller than the rod for a distance less than the length of the rod as required to accomodate spring loaded plunger type contacts 104 and 106 shown inserted in place in the rod 34 in FIG. 5.

As shown in FIG. 5, the contact assembly 104, which is exemplary of the other assemblies, includes a barrel 105 in which there is mounted a coil spring for biasing the contact 76 toward the transducer. The dimensions of the contacts are such that when the feedthrough body 24 is welded in place in the pressure receiving body 12, as shown in FIG. 3, the contacts maintain a complete circuit between the circuit card and the appropriate elements of the transducer. In order that good contact will be made the spring loaded plunger contacts should be gold plated. While the manner in which two of the feedthrough rods are mounted in the body 24 is shown in FIG. 3, it will be understood that the third rod 35 is similarly fitted into the body 24. The benefits derived from using contacts of the above described type include the benefit of having a means for contacting the transducer without taking up much space in the cavity where the transducer is mounted. The cavities of pressure transducers of this type typically are filled with a silicone oil, as previously mentioned. It is desireable to minimize the volume of that oil in order to minimize the effect of the temperature coefficient of the oil and also to minimize the amount of oil available to be compressed when there is a pressure increase in the line. The spring loaded contacts used in this invention are effective in minimizing the volume of oil since most of the contact structure is located inside the feedthrough body itself rather than in the transducer cavity as would be necessary if other spring type contacts were used.

As is also shown in FIG. 3, the rods 34, 35, and 36 are received by spring contacts 110, 112, and 114 in the circuit board 32 so that contact with the circuit is made.

The contacts 110, 112, and 114 may be of the type which utilizes coiled springs circling around the interior of their sockets to frictionally engage the inserted rods.

An electrical feedthrough of the type shown in FIG. 3 has certain benefits when constructed as shown. Thus, the arrangement of the three rods 34, 35, and 36 provides a coaxial system in which the conductors are each isolated by a ground plane and a minimum of stray capacitance is present. As shown, contact with the transducer is made without the need to have leads going around the transducer to the bottom. This keeps the volume of the silicone oil to a minimum. Also, the contact points on the transducer are kept as far as possible from the deflecting area of the diaphragm to reduce the effects of the forces transmitted by the contact arrangement.

It should be noted that the feedthrough body is made of the Fe-Ni-Co alloy known as Kovar and is dimensioned so that with changes in temperature the stainless steel body 12 and the feedthrough body 24 have thermal expansions that are such that there is a change in the spacing betweem the two, below the weld 27, such that it is substantially equal to the change in volume of the silicone oil resulting from the temperature change or provides part of the compensation for such a change in volume. This compensation may, of coursem be shared with other parts of the transducer assembly, such as may be found in the pressure receiving section of the assembly.

FIG. 3 also shows in cross section the locking assembly which is used to keep the housing 38 from being rotatable with respect to the pressure receiving body 12 to which it is threadably engaged. An exploded view is shown in FIG. 4. It will be noted that the housing surface 120, which is to be mounted on the threaded shaft like end of the pressure receiving body 12, has a recess 119 around its threaded hole. The recess has tapered sides 122 which have a geometric shape or profile in the plane of the housing surface which will resist rotation. Thus, the shape should be non-circular. It may, for example, have one flat side. Preferably the recess has many flat sides. It can, therefore, be hexagonal in configuration, as shown.

The threaded shaft like end of the pressure receiving body 12 has opposing parallel flats or relief surfaces 124 and 126. A locking c-ring 40 is constructed to have a slot providing an open end to a central aperature which fits over the flat surfaces so that any rotation of the ring will cause a rotation of the body 12. The outer periphery of the ring has a profile or geometry to match that of the recess sides 122 except that the sides of the ring are straight, that is they are parallel to the axis of the shaft and hence not tapered as are the recess sides. The dimensions of the ring are such that the straight sides of the ring engage the tapered sides of the recess, as shown in FIG. 3. Preferably the ring is made of harder material than the housing 38.

After the housing 38 is threaded onto the end of body 12 it must be backed off a small amount to a point where the ring can be slipped over the end of body 12 and fit in the housing recess 119. Then the nut 42 is threaded onto the body 12 and is thightened. As the nut is tightened the tapered sides of the recess 119 cause the sides of the ring to cam over the sides of the recess. This causes the ring 40 to be elastically deformed so as to grasp the flats 124 and 126 after which the ring bites into the tapered sides 122 of the recess 119 plastically deforming the tapered sides 122, as shown. This causes the fit of the ring in the recess to be so tight that there will not be any rotation of the housing with respect to the pressure receiving body 12. The purpose of this locking assembly is to prevent a rotation of parts such as the circuit board 32 with respect to the rods 34, 35, and 36 which the board contacts. This problem with rotation can arise without there being any intent on the part of the user of the transducer assembly to rotate the housing. The rotation can, for example, occur when conduit is being connected to the housing during installation. With the present arrangement even the application of larger than normal rotational forces on the housing will not damage the assembly.

What is claimed is:

1. An anti-rotation locking assembly for preventing rotation of a housing member with respect to a threaded body to which the housing member is threadably mounted when the housing has a threaded hole in the housing surface to be mounted so that said hole may threadably accept the threaded body and allow said threaded body to be threaded through said surface so as to extend beyond said housing surface for a sufficient length to accept a nut for locking said surface with respect to said threaded body, comprising:

two opposing flat relief surfaces on said threaded body in that region of the threaded body extending beyond said housing surface when threaded engagement between the housing surface and said body is complete;

a tapered sided recess in said surface around said hole, said recess having a non-circular profile in the plane of said surface;

a straight sided c-ring having a profile matching that of said recess with outer dimensions which cause its periphery to engage said tapered sides, said ring also having a central opening which will allow the ring to slip over said threaded body and engage said relief surface; and a nut threaded on said threaded body over said ring to press said straight sided ring into said tapered recess to first cause elastic deformation of the ring so that the central opening of the ring closes to grip said relief surfaces and then to cause said ring to plastically deform the sides of said recess as the straight sides of said ring bite into the tapered sides of said recess upon tightening of said nut.

2. A mounting arrangement for mounting a housing to the pressure receiving body of a pressure transducer so as to prevent rotation of the housing with respect to the body, comprising:

a threaded hole in said housing surface;

a threaded portion on said body for threadable engagement in the hole of said housing so that said threaded portion extends through said hole for a distance sufficient to allow engagement of a nut thereon;

a tapered sided recess around said hole in said housing, said recess having a periphery which is non-circular;

two opposing flat relief surfaces on that portion of said body extending through said housing;

a staight sided c-ring whose outer periphery is shaped to match that of said recess and whose interior opening matches the relieved surface on said body, said outer periphery having dimensions such that the straight sides of said ring engage the tapered sides of said recess upon assembly of said ring on the portion of said body extending through said housing; and a threaded nut mounted on said body portion extending through said housing for pressing said ring into said recess upon tightening of said nut so as to lock said housing to said body in avoidance of rotation therebetween.

3. A mounting arrangement for mounting a housing to the pressure receiving body of a pressure transducer so as to prevent rotation of the housing with respect to the body, comprising:

a threaded hole in said housing surface;

a threaded portion on said body for threadable engagement in the hole of said housing so that said threaded portion extends through said hole for a distance sufficient allow engagement of a nut thereon;

a tapered sided recess around said hole in said housing, said recess having a periphery which is non-circular;

two opposing flat relief surfaces on that portion of said body extending through said housing;

a c-ring whose outer periphery is shaped to match that of said recess and whose interior opening matches the relieved surface on said body, said outer periphery having dimensions and shape such that the sides of said ring engage the sides of said recess so as to cam over the sides of said recess causing said c-ring to grip said flat relief surfaces upon assembly of said spacer on the portion of said body extending through said housing and the application of pressure on said ring; and a threaded nut mounted on said body portion extending through said housing for pressing said ring into said recess upon tightening of said nut so as to lock said housing to said body in avoidance of rotation therebetween.

4. In a mounting arrangement for preventing rotation of a surface having a threaded hole threadably engaged to a threaded shaft so that said threaded portion of the shaft extends through said hole for a distance sufficient to allow engagement of a nut thereon, the combination comprising:

a tapered sided recess in said surface coaxial with said hole, said recess having a periphery which is no-circular;

two opposing flat relief surfaces on said shaft;

a c-ring whose outer periphery is shaped to match that of said recess and whose interior opening matches the relieved surface on said body, said outer periphery having dimensions such that the sides of said ring engage the sides of said recess upon assembly of said ring on the portion of said shaft extending through said surface; and a threaded nut threadably engaged on that portion of the shaft extending through said surface so that upon tightening of said nut said ring is pressed into said recess so as to lock said surface to said shaft in avoidance of rotation therebetween.

5. A mounting arrangement as set forth in claim 4 in which;

the sides of said recess are tapered;

the sides of said ring are straight; and the material of said ring is harder than the material of the sides of said recess.

* * * * *